Patented May 16, 1939

2,158,098

UNITED STATES PATENT OFFICE 2,158,098

METHOD FOR SYNTHESIZING ALLANTOIN

Carl N. Zellner and Joseph R. Stevens, Rahway, N. J., assignors to Merck & Co. Inc., Rahway, N. J., a corporation of New Jersey No Drawing. Application February 6, 1937, Serial No. 124,526

12 Claims. (Cl. 260—309)

The present invention relates to a new and improved method for synthesizing allantoin, for application to any of the uses to which allantoin may be adapted.

One of the possible uses is the treatment of wounds. In the maggot treatment of wounds allantoin is produced physiologically and excreted by the maggots.

Previous methods of synthesis have placed limitations on the use of allantoin because of the relatively high cost of production, due either to poor yields or to expensive raw materials. For example, it is obtained in fair yield from uric acid but this is relatively high in cost. It has also been obtained by the condensation of glyoxylic acid and mesoxalic acid, respectively, with urea, but the yield has been low.

In practicing the present invention in a typical case, one molecule of diethoxyacetic acid ethyl ester is reacted with two molecules of urea as shown by the following structural equation:

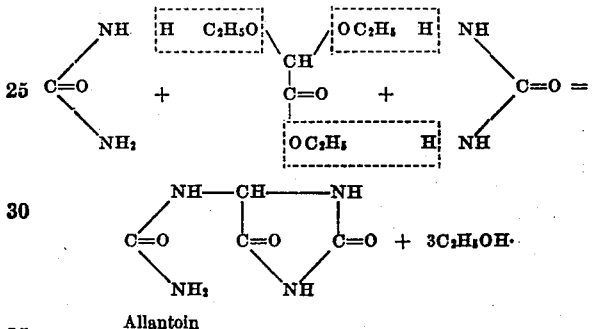

Allantoin

The above reaction may be carried out as follows:

Example 1

| Reagents employed | Quantities, grams |
|---|---|
| Diethoxyacetic acid ethyl ester | 294 |
| Urea | 392 |
| Ethylene glycol monoethyl ether | 600 |
| Conc. HCl | 261 |

The above reagents were refluxed in a 3 liter flask in an oil bath at 120° C. for 20 hours (the temperature of the reaction mixture being 105–110° C.). A 40-inch air condenser was used, allowing some of the alcohol formed to escape. After standing in the ice box 24 hours the product was filtered, washed with 200 cc. portions of water, then 200 cc. of a mixture of alcohol and ether in equal portions and then with 100 cc. of ether. The yield was 135 grams and upon recrystallization from water 118 grams or 45 per cent of the theoretical yield was obtained.

In the above example, the HCl acts as a condensing agent and the ethylene glycol monoethyl ether has the advantage of retaining the reactants in solution. Urea hydrochloride is present where hydrochloric acid is used as a condensing agent and the yield is improved by employing a solvent that will dissolve not only the diethoxyacetic acid ester but also the urea hydrochloride. A mixture of ethyl or methyl alcohol with dioxane can also be used as a mutual solvent for the urea salt and the diethoxyacetic acid ester, instead of ethylene glycol monoethyl ether.

A solvent which has the power of retaining the reacting bodies in solution has its advantages enhanced when it also is of relatively high boiling, e. g. above 100° C. Ethylene glycol monoethyl ether is an illustration of a solvent which possesses both advantages. It boils approximately at 135° C.

Instead of starting with the dialkoxy acetic acid esters it is possible to employ other disubstituted acetic acid compounds. For example, it has been found that dichloracetic acid can be condensed with urea by heating these substances in the proportion of 1 mol of acid and 2 mols of urea at a temperature of 120° C. without any condensing agents, according to the following equation:

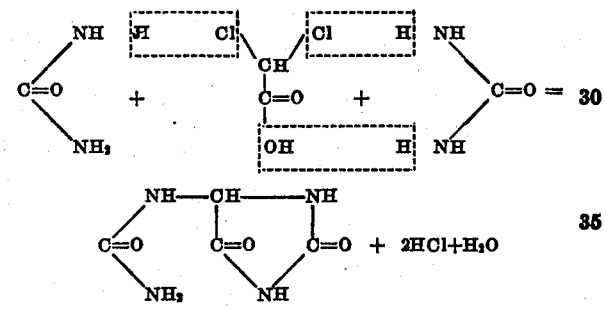

Allantoin

Instead of dichloracetic acid, other disubstituted acetic acids and functional derivatives thereof can be reacted with urea according to the following equation:

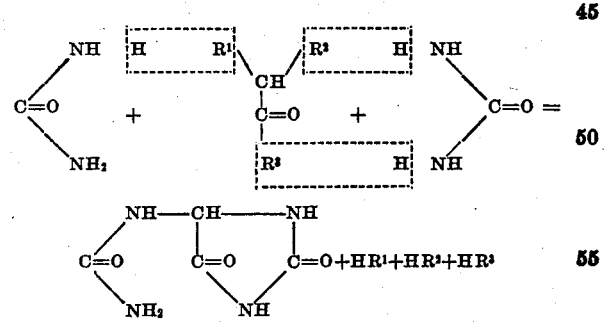

As illustrative examples $R^1$, $R^2$ and $R^3$ may be a halogen atom, a hydroxyl radical, an amine (—NH₂) radical, an alkoxy, aryloxy or aralkoxy radical or group. Upon reaction with urea, when two molecules of urea are available for each molecule of disubstituted acetic acid derivative, $R^2$ and $R^3$, respectively, combine with two hydrogen atoms of one urea molecule to form $HR^2$ and $HR^3$ and $R^1$ combines with one hydrogen atom of another urea molecule to form $HR^1$, as shown by the above equation.

By a functional derivative of any given disubstituted acetic acid is meant derivatives of that acid differing only in respect of the nature of the radical $R^3$. Thus when $R^3$ is a halogen atom, an amide (—NH₂) group, an alkyl aryl or aralkyl group, these various derivatives are all functional derivatives of the particular disubstituted acetic acid to which they relate.

It was discovered that in the reaction between dichloracetic acid and urea the use of sodium ethylate as condensing agent improved the yield of allantoin, and in seeking the cause of this improvement it was realized that the ethylate probably formed the intermediate compound, sodium diethoxyacetate, which, upon acidification with HCl, produced diethoxyacetic acid, the latter then reacting with urea; the series of reactions involved being as follows:

(1) $3C_2H_5O\ Na + Cl_2CH\ COOH =$
$(C_2H_5O)_2\ CH\ COO\ Na + 2NaCl + C_2H_5OH$ (2) $(C_2H_5O)_2\ CH\ COONa + HCl =$
$(C_2H_5O)_2\ CH\ COOH + NaCl$

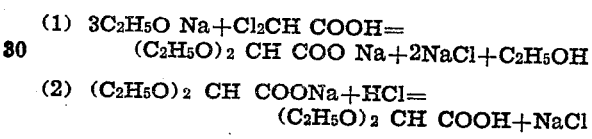
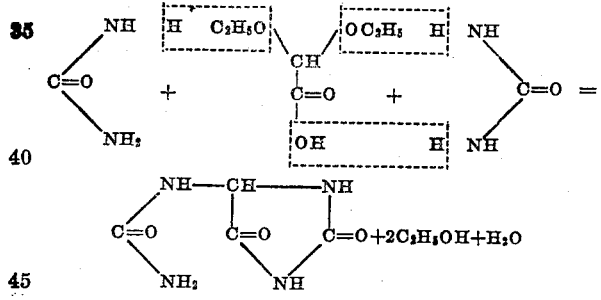

The above series of reactions can be carried out as follows:

*Example 2*

Dichloracetic acid _____grams__ 13
Urea _____do____ 24
Sodium ethylate solution
grams of sodium in 140 cc. of alcohol_____ 7.5

These ingredients were refluxed 10 hours on the water bath, then cooled, excess of HCl added, and the mixture evaporated on the water bath to dryness. The residue was washed with cold water and recrystallized from water.

In the above reaction, free diethoxyacetic acid is formed by reaction of hydrochloric acid with the sodium diethoxyacetate. Instead of reacting the dichloracetic acid with alcoholate in the presence of urea as above set forth, the diethoxyacetic acid can be first prepared, as a separate step, and then reacted with urea in the presence of a condensing agent, e. g. HCl, in a suitable solvent.

A still further improvement and one which constitutes the preferred method of the present invention comprises first preparing the ester of the alkoxyacetic acid, e. g. diethoxyacetic acid ethyl ester, and reacting this (instead of free dialkoxyacetic acid) with urea in the presence of a condensing agent. The ester may be prepared by reacting dichloracetic acid with sodium ethylate solution followed by esterification as described by Wohl and Lange, Berichte 41, 3612.

The ester may then be reacted with urea by a method illustrated in Example 1. Instead of the ethoxy compounds, other homologous and analogous compounds, e. g. methoxy, propoxy, butoxy, etc. may be used, as well as aryloxy (e. g. phenoxy compounds) and aralkyloxy (e. g. benzyl) compounds, and instead of the ethyl ester of the disubstituted acetic acids, the methyl, propyl, butyl, phenyl, benzyl and other alkyl, aryl and aralkyl esters may be employed.

Having set forth the principles of the invention as well as certain specific aspects thereof and having pointed out and fully disclosed specific illustrations of means for practicing the invention, it will be defined in the appended claims, interpreted in the light of the specification and the prior art.

What we claim is:

1. The process of synthesizing allantoin which comprises reacting urea with a compound selected from the group consisting of a disubstituted acetic acid and its functional derivatives according to the following equation:

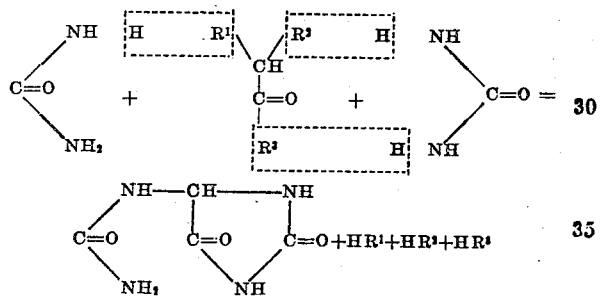

wherein $R^1$ and $R^2$ are selected from the group consisting of halogen atoms, hydroxyl radicals, alkoxy radicals, aryloxy radicals, and aralkoxy radicals, and $R^3$ is selected from the group consisting of an halogen atom, hydroxyl radical, amine group, alkoxy radical, aryloxy radical and aralkoxy radical.

2. The process of synthesizing allantoin comprising reacting urea with the compound selected from the group consisting of a disubstituted acetic acid, the esters, acid chlorides and amides of said disubstituted acetic acid, wherein the substituents are selected from the group consisting of halogen atoms, hydroxyl radicals, alkoxy radicals, aryloxy radicals, and aralkoxy radicals.

3. The process of synthesizing allantoin which comprises reacting an ester of a dialkoxyacetic acid with urea.

4. The process of synthesizing allantoin which comprises reacting an ester of diethoxyacetic acid with urea.

5. The process of synthesizing allantoin which comprises reacting an ester of dimethoxyacetic acid with urea.

6. The process of synthesizing allantoin which comprises reacting the ethyl ester of a dialkoxyacetic acid with urea.

7. The process of synthesizing allantoin which comprises reacting the methyl ester of a dialkoxyacetic acid with urea.

8. The process of synthesizing allantoin which comprises reacting an ester of a dialkoxyacetic acid with urea in a mutual solvent for the reacting bodies.

9. The process of synthesizing allantoin which comprises reacting an ester of a dialkoxyacetic acid with urea in the presence of an acid condensing agent which forms a salt with urea during the reaction, and in the presence of a common solvent for said urea salt and other reacting bodies.

10. The process of synthesizing allantoin which comprises reacting an ester of a dialkoxyacetic acid with urea in a mutual solvent for the reacting bodies, the temperature of the reaction solution being above 100° C.

11. The process of synthesizing allantoin which comprises reacting an ester of a dialkoxyacetic acid with urea at a temperature above 100° C. in the presence of a common solvent for the reacting bodies.

12. The process of synthesizing allantoin which comprises reacting an ester of a dialkoxyacetic acid with urea at a temperature above 100° C. in the presence of a common solvent for the reacting bodies said solvent having a boiling point above 100° C.

CARL N. ZELLNER.
JOSEPH R. STEVENS.